US012594750B2

(12) United States Patent
Cho et al.

(10) Patent No.: US 12,594,750 B2
(45) Date of Patent: Apr. 7, 2026

(54) TEXTILE FABRIC AND METHOD OF MANUFACTURING SAME

(71) Applicants: HYUNDAI MOTOR COMPANY, Seoul (KR); KIA CORPORATION, Seoul (KR); TKG ECO MATERIAL CO., LTD., Busan (KR)

(72) Inventors: Hyun Dae Cho, Anyang-si (KR); Myoung Ryoul Lee, Seoul (KR); Seul Yi, Seoul (KR); Gu Hwan Kim, Busan (KR); Jin Hun Cha, Busan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 251 days.

(21) Appl. No.: 18/211,192

(22) Filed: Jun. 16, 2023

(65) Prior Publication Data

US 2024/0140078 A1     May 2, 2024

(30) Foreign Application Priority Data

Nov. 2, 2022    (KR) ......................... 10-2022-0144183

(51) Int. Cl.
| | |
|---|---|
| *B32B 27/12* | (2006.01) |
| *B32B 27/08* | (2006.01) |
| *B32B 27/36* | (2006.01) |
| *B32B 27/40* | (2006.01) |
| *B32B 37/00* | (2006.01) |
| *B32B 37/06* | (2006.01) |
| *B32B 37/15* | (2006.01) |

(52) U.S. Cl.
CPC .............. *B32B 27/12* (2013.01); *B32B 27/08* (2013.01); *B32B 27/36* (2013.01); *B32B 27/40* (2013.01); *B32B 37/0053* (2013.01); *B32B 37/06* (2013.01); *B32B 37/153* (2013.01);

*B32B 2305/18* (2013.01); *B32B 2307/412* (2013.01); *B32B 2307/536* (2013.01); *B32B 2307/7376* (2023.05)

(58) Field of Classification Search
None
See application file for complete search history.

(56) References Cited

U.S. PATENT DOCUMENTS

| | | | |
|---|---|---|---|
| 10,472,763 B2 | 11/2019 | Kim et al. | |
| 2013/0035012 A1* | 2/2013 | Jung ........................ | D06N 3/14 |
| | | | 442/93 |
| 2014/0079943 A1 | 3/2014 | Feng et al. | |
| 2015/0258749 A1 | 9/2015 | Chang | |
| 2016/0053434 A1 | 2/2016 | Feng et al. | |
| 2018/0148891 A1 | 5/2018 | Kim et al. | |

FOREIGN PATENT DOCUMENTS

| | | |
|---|---|---|
| CN | 103541228 A | 1/2014 |
| KR | 20060039037 A | 5/2006 |
| KR | 101718314 B1 | 3/2017 |
| KR | 101905798 B1 | 10/2018 |
| KR | 20210039740 A | 4/2021 |

* cited by examiner

*Primary Examiner* — Sheeba Ahmed
(74) *Attorney, Agent, or Firm* — Lempia Summerfield Katz LLC

(57) ABSTRACT

A textile fabric includes a textile fabric layer, a transparent film layer provided on the textile fabric layer, and a surface layer disposed on the transparent film layer. The transparent film layer has a two-layer structure including a first film layer having a first polyetherester-based copolymer and a second film layer having a second polyetherester-based copolymer disposed on the first film layer. The second film layer is provided on the textile fabric layer. A method of manufacturing the fabric includes preparing the textile fabric layer, forming the transparent film layer on the fabric layer, and laminating the textile fabric and transparent film layers through heat treatment.

9 Claims, 8 Drawing Sheets

Comparative Example 1          Example 1

| Initial staining | Impossible to remove (denim smear) | Initial staining | After removal |

Chrominance 9.1
(Not removed)

Chrominance 4.2 -> 2.2 (After removal)

Comparative Example 1          Example 1

Initial absorption of staining source -> Grade 1-2 after washing          Initial non-absorption-> Grade 4-5 after washing

TEXTILE FABRIC AND METHOD OF MANUFACTURING SAME

CROSS-REFERENCE TO RELATED APPLICATION

This application claims, under 35 U.S.C. § 119(a), the benefit of priority to Korean Patent Application No. 10-2022-0144183, filed on Nov. 2, 2022, the entire contents of which are incorporated herein by reference.

BACKGROUND

(a) Technical Field

The present disclosure relates to a textile fabric having advantageous stain resistance and durability, and to a method of manufacturing the same.

(b) Background Art

Fabrics for use in vehicle (e.g., automobile) interiors include natural leather, artificial leather, textile fabrics, and the like. In general, artificial leather is mainly applied to attain durability and anti-stain properties. It is required for artificial leather to realize a color and pattern similar to those of textile fabrics for design and aesthetics.

SUMMARY

The present disclosure has been made keeping in mind the problems encountered in the related art. An object of the present disclosure is to provide a textile fabric having advantageous stain resistance. Another object of the present disclosure is to provide a method of manufacturing the textile fabric.

Another object of the present disclosure is to provide a textile fabric having desirable durability and a further object is to provide a method of manufacturing the same.

The objects of the present disclosure are not limited to the foregoing. The objects of the present disclosure should be more clearly understood through the following description and may be realized by the textile fabrics and methods described in the claims and combinations thereof.

An embodiment of the present disclosure provides a textile fabric including a textile fabric layer and a transparent film layer disposed on the textile fabric layer. The transparent film layer includes a first film layer having a first polyetherester-based copolymer and a second film layer having a second polyetherester-based copolymer. The second film layer is disposed on the textile fabric layer.

The textile fabric may further include a surface layer disposed on the first film layer and the surface layer may have a polymer resin.

The polymer resin may include polyurethane.

The surface layer may have a thickness in a range of 0.005 millimeters (mm) to 0.02 mm.

The first film layer may have a thickness in a range of 5 micrometers (μm) to 50 μm.

The second film layer may have a thickness in a range of 50 μm to 100 μm.

The transparent film layer may have a thickness in a range of 55 μm to 150 μm.

The first polyetherester-based copolymer may have a melting point (Tm) in a range of 150° C. to 190° C., a hardness in a range of 20D to 30D (SHORE D hardness tester), and a melt index (MI) in a range of 10 to 50 grams per 10 minutes (g/10 min) (220° C./2.16 kilograms (kg)).

The second polyetherester-based copolymer may have a melting point (Tm) in a range of 100° C. to 160° C., a hardness in a range of 15D to 25D (SHORE D hardness tester), and a melt index (MI) of 10 to 40 g/10 min (230° C./2.16 kg).

Another embodiment of the present disclosure provides a method of manufacturing a textile fabric including preparing a textile fabric layer, forming a transparent film layer on the textile fabric layer, and laminating the textile fabric layer and the transparent film layer through heat treatment.

The method may further include forming a surface layer by applying a polymer resin onto the first film layer.

Forming the transparent film layer on one surface of the textile fabric layer may include forming a transparent film layer by simultaneously extruding a first film layer and a second film layer. The first film layer and the second film layer may be laminated using a cold pressing roll.

The textile fabric layer and the transparent film layer may be laminated by passing through a hot-air chamber at a range of 120° C. to 160° C.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus the embodiments are not limitative of the present disclosure, and wherein.

DETAILED DESCRIPTION

Figure 1:
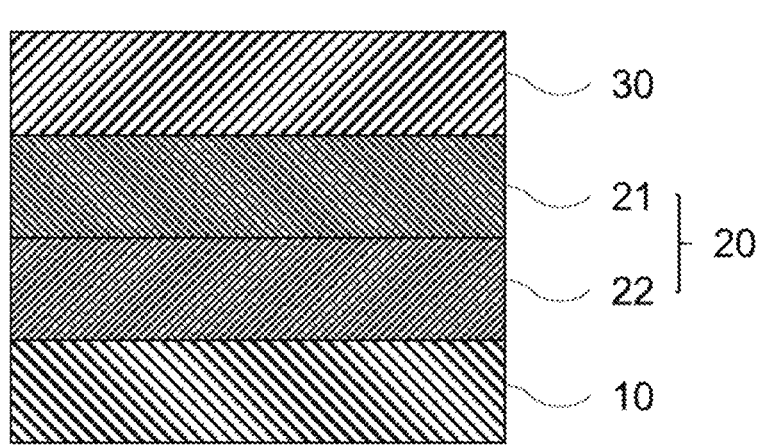
FIG. 1 shows a cross-section view of a textile fabric according to an embodiment of the present disclosure.

The above and other objects, features, and advantages of the present disclosure should be more clearly understood from the following embodiments taken in conjunction with the accompanying drawings. The present disclosure is not limited to the embodiments disclosed herein and the embodiments may thus be modified into different forms. These embodiments are provided to thoroughly explain the disclosure and to sufficiently transfer the spirit of the present disclosure to those having ordinary skill in the art.

Throughout the drawings, the same reference numerals refer to the same or like elements. For the sake of clarity of the present disclosure, the dimensions of structures may be depicted as being larger than the actual sizes thereof. It should be understood that, although terms such as "first," "second," and the like may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It should be further understood that the terms "comprise," "include," "have," and the like, when used in this specification, specify the presence of stated features, integers, steps, operations, elements, components, or combinations thereof, but do not preclude the presence or addition of one or more other features, integers, steps, operations, elements, components, or combinations thereof. Also, it should be understood that, when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 shows a cross-section view of a textile fabric according to an embodiment of the present disclosure. The textile fabric according to the present disclosure includes a textile fabric layer 10, a transparent film layer 20, and a surface layer 30. The transparent film layer 20 includes a first film layer 21 and a second film layer 22.

The textile fabric layer 10 may be formed of a polyester-based woven fabric, warp knitted fabric, or circular knitted fabric. Additionally, dope-dyed yarns, dyes, and the like may be applied to realize the color of the textile fabric, but the present disclosure is not limited thereto. In the present disclosure, in order to prevent dye migration and discoloration, it is desirable to use a fabric to which dope-dyed yarns are applied.

The transparent film layer 20 may have a two-layer structure including a first film layer 21 and a second film layer 22. The first film layer 21 includes a first polyetherester-based copolymer. The second film layer 22 includes a second polyetherester-based copolymer disposed on the first film layer.

The textile fabric layer 10 and the transparent film layer 20 may be laminated so that the second film layer 22 is provided on the textile fabric layer 10.

The transparent film layer 20 may have a thickness of 55 micrometers (μm) to 150 μm. The first film layer 21 may have a thickness of 5 μm to 50 μm, and the second film layer 22 may have a thickness of 50 μm to 100 μm.

If the thickness of the transparent film layer 20 is less than 55 μm, the amount of the second film layer 22 that penetrates between the valleys in a woven fabric may not be sufficient. Thus, bonding strength and wear resistance between the textile fabric layer 10 and the second film layer 22 may be deteriorated. On the other hand, if the thickness thereof exceeds 150 μm, the three-dimensional (3D) pattern effect of the textile fabric layer 10 may not be sufficient, the surface thereof may exhibit a film texture, rather than a fabric texture, and elongation of the product may be decreased. Thus, post-processing workability such as wrapping, and the like, may deteriorate.

The first film layer 21 may include a first polyetherester-based copolymer.

Polyetherester resin is superior in flexibility, heat resistance, processability, and the like compared to general polyethylene (PE) and polypropylene (PP) polymer resins. Thus, polyetherester resin has superior durability compared to poly vinyl chloride (PVC) resins, making it possible to extrude the same into a thin film.

The first polyetherester-based copolymer may include a polycondensate of terephthalic acid, 1,4-butanediol, and polytetramethylene glycol.

The first polyetherester-based copolymer has a melting point (Tm) in a range of 150° C. to 190° C., a hardness in a range of 20D to 30D (SHORE D hardness tester), and a melt index (MI) in a range of 10 to 50 grams per 10 minutes (g/10 min) (220° C./2.16 kg).

The second film layer 22 may include a second polyetherester-based copolymer.

The second polyetherester-based copolymer has a melting point (Tm) in a range of 100° C. to 160° C., a hardness in a range of 15D to 25D (SHORE D hardness tester), and a melt index (MI) in a range of 10 to 40 g/10 min (230° C./2.16 kg).

The second film layer 22 has a melting point (Tm) lower than that of the first film layer and has a configuration capable of imparting adhesiveness by thermal processing. If the melting point of the first film layer 21 is low, a problem may occur in film stability during post-processing in which heat is applied, such as surface embossing, lamination, and the like. Also, if the melting point of the second film layer 22 is low, a difference in the melting point with the first film layer 21 may increase. Thus, extrusion workability problems, such as foaming in the second film layer 22, may occur upon simultaneous extrusion.

If the hardness of the first film layer 21 and the second film layer 22 is low, mechanical properties such as bending resistance and wear resistance may deteriorate. On the other hand, if the hardness is high, product quality such as softness, elongation reduction, and the like, and post-processing workability such as wrapping, and the like, may deteriorate.

If the melt index (MI) of the first film layer 21 and the second film layer 22 is low, problems such as a decrease in working speed during extrusion of the film layer, a decrease in extrusion workability of the film layer, and the like may occur. On the other hand, if the melt index is high, problems such as thickness non-uniformity, shape instability, and the like may occur.

Also, the surface layer 30, which includes a polymer resin, may be provided on the transparent film layer 20. Through the surface layer 30, the touch texture and the gloss of the surface may be adjusted.

The polymer resin may include polyurethane.

The surface layer 30 may have a thickness of 0.005 millimeters (mm) to 0.02 mm. If the thickness is less than 0.005 mm, the amount of the applied coating solution is small. This may cause a problem in that film stability such as wear resistance, and the like may deteriorate. On the other hand, if the thickness thereof exceeds 0.02 mm, transparency may be lower and the touch sensation of the fabric texture may deteriorate.

Figure 2:
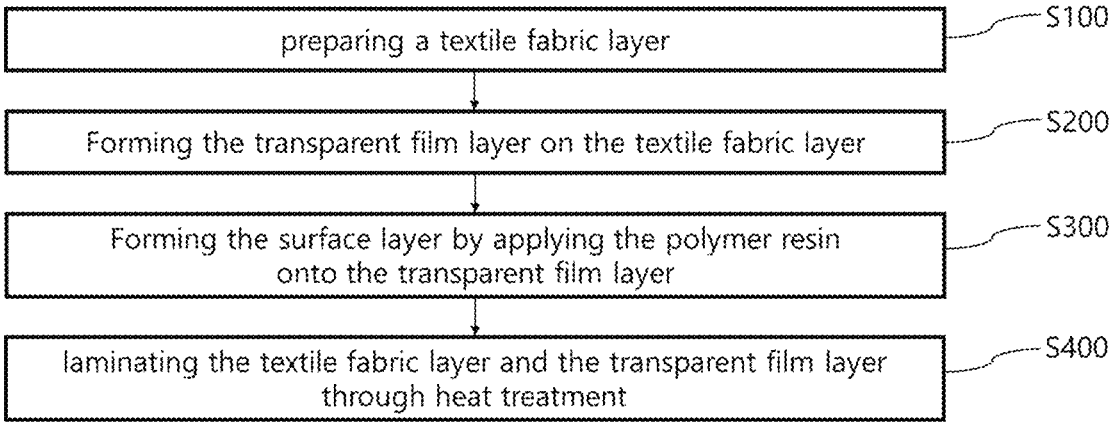
FIG. 2 shows a flowchart of a process of manufacturing a textile fabric according to an embodiment of the present disclosure.

FIG. 2 shows a process of manufacturing a textile fabric according to an embodiment of the present disclosure. The method of manufacturing the textile fabric according to the present disclosure may include preparing a textile fabric layer (S100) and forming a transparent film layer on the textile fabric layer (S200). The method may further include forming a surface layer by applying a polymer resin onto the transparent film layer (S300) and laminating the textile fabric layer and the transparent film layer through heat treatment (S400).

In preparing the textile fabric layer (S100), the textile fabric layer may be formed of a fabric to which dope-dyed yarns are applied.

Forming the transparent film layer on the textile fabric layer (S200) may include forming a transparent film layer having a two-layer structure by simultaneously extruding a first film layer and a second film layer. The first film layer and the second film layer may be laminated using a cold pressing roll.

Forming the surface layer by applying the polymer resin onto the transparent film layer (S300) may be performed by applying a water-based polyurethane resin coating solution. For example, 20 to 50 grams per square meter (g/sqm) of the water-based polyurethane resin coating solution may be applied onto the transparent film layer with a gravure roll to form a thin film, which may then be dried in a hot-air chamber at 110° C. to 150° C.

In laminating the textile fabric layer and the transparent film layer through heat treatment (S400), heat is applied to the second film layer so that the second film layer has adhesiveness.

Accordingly, in order to uniformly adhere the transparent film layer and the textile fabric layer to each other, the layers may be pressed by passing through a hot-air chamber at 120° C. to 160° C. The second film layer may be melted and uniformly applied between irregularities in the textile fabric layer by hot air and pressure. Thus, the transparent film layer and the textile fabric layer have no unadhered surface therebetween, thereby solving problems such as low transparency, surface whitening, and poor appearance.

As such, where lamination is carried out using a cold pressing roll rather than the heat treatment process, the adhesive cannot be applied into the empty space of the irregularities in the textile fabric layer. Thus, transparency may be lowered due to the unadhered portion between the transparent film layer and the textile fabric layer, and surface whitening and poor appearance may occur.

A better understanding of the present disclosure may be obtained through the following examples and comparative examples. However, these examples are not to be construed as limiting the technical spirit of the present disclosure.

Test Example 1: Comparison of Physical Properties

The physical properties of Example 1 and Comparative Examples 1 and 2 were compared. The results thereof are shown in Table 1 below and FIGS. 3-5.
Example and Comparative Examples are as follows.

Example 1

A first film layer and a second film layer were simultaneously extruded to form a transparent film layer having a two-layer structure. The transparent film layer and a textile fabric layer were laminated. Next, 20-50 g/sqm of a water-based polyurethane resin coating solution was applied onto the transparent film layer with a gravure roll to form a surface layer, which was then dried in a hot-air chamber at 110-150° C. A textile fabric was manufactured by laminating the layers through a hot-air chamber at 120 to 160° C. The thicknesses of the first film layer and the second film layer are shown in Table 1 below.

Comparative Example 1

A product made of a textile fabric alone that is currently employed in automobile interiors was used.

Comparative Example 2

A first film layer and a second film layer were simultaneously extruded to form a transparent film layer having a two-layered structure. The transparent film layer and a textile fabric layer were laminated. Next, 20-50 g/sqm of a water-based polyurethane resin coating solution was applied onto the transparent film layer with a gravure roll to form a surface layer, which was then dried in a hot-air chamber at 110-150° C. A textile fabric was manufactured through laminating the layers by cold pressing using a cold pressing roll at 50-70° C. in a state in which the surface of the transparent film layer was preheated to 160-180°. The thicknesses of the first film layer and the second film layer are shown in Table 1 below.

TABLE 1

| Classification | | Requirement | Comparative Example 1 | Comparative Example 2 | Example 1 |
|---|---|---|---|---|---|
| Transparent film layer | First film layer | — | — | 0.10-0.15 mm | 5-50 µm |
| | Second film layer | — | — | 0.10-0.15 mm | 50-100 µm |
| Lamination of layers (S400) | | — | — | Cold pressing roll | Hot-air processing |
| MS300-31 (artificial leather) | Wear resistance (grade) | For interiors (250 times, grade 3) | Grade 4 | Grade 2-3 | Grade 4-5 |
| | | For seats (2,000 times, grade 4) | Grade 3-4 (little fluff) | Grade 2 (fine damage) | Grade 4 |
| | Stain resistance (ΔE) | Denim staining (initial 8/ 4 or less after removal) | 9.1/ impossible to remove | 5.7/1.9 | 4.2/2.2 |

TABLE 1-continued

| Classification | Requirement | Comparative Example 1 | Comparative Example 2 | Example 1 |
|---|---|---|---|---|
| Appearance | Textile texture (weaving/unevenness) | Standard | Poor (like artificial leather) | Good |
| Whitening | Initial | — | Occurrence (irregularities) | Good |
| | After pulling/sewing | — | Occurrence | Good |

Figure 3:
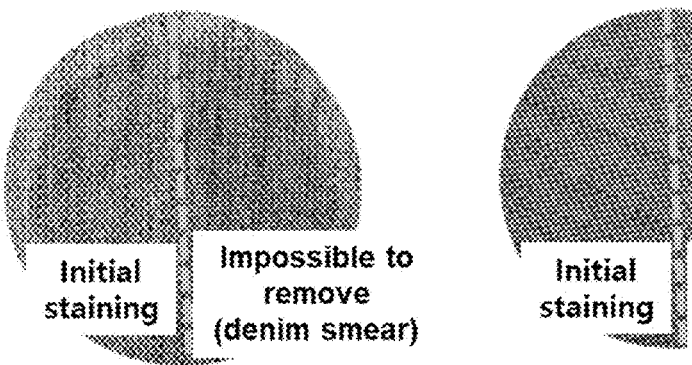
FIG. 3 shows the results of an evaluation of denim staining of Example 1 and Comparative Example 1.
Figure 4:
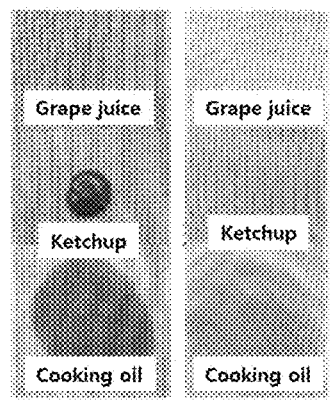
FIG. 4 shows the results of an evaluation of staining of Example 1 and Comparative Example 1.
Figure 4:
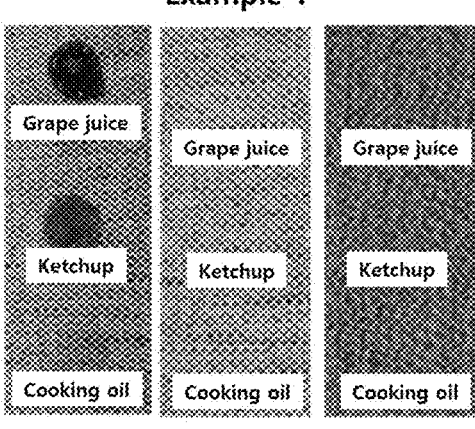
Figure 5:
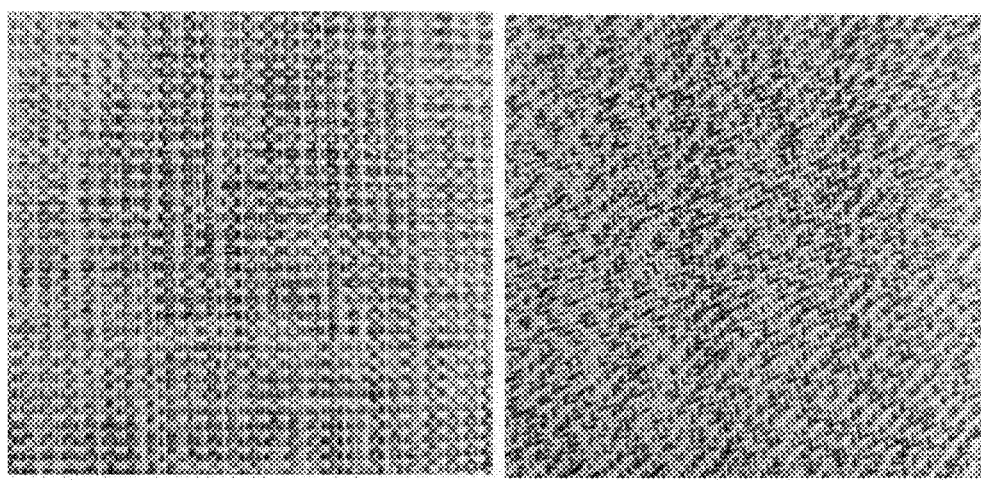
FIG. 5 shows the appearance of Example 1.

FIG. 3 shows the results of an evaluation of denim staining of Example 1 and Comparative Example 1. FIG. 4 shows the results of an evaluation of the staining of Example 1 and Comparative Example 1. FIG. 5 shows the appearance of Example 1.

With reference to Table 1 and FIGS. 3-5, in the product made of textile fabric alone according to Comparative Example 1, it was confirmed that the staining source penetrated the fabric during the staining test and the stains were not removed.

In contrast, the stain resistance of Comparative Example 2 and Example 1 was good compared to Comparative Example 1 by virtue of the thin film preventing the staining source from penetrating the fabric. However, in Comparative Example 2, the thin film was thick and the thin film was not uniformly adhered between the valleys in the woven fabric due to lamination through cold pressing, thus showing unsatisfactory results in view of appearance including textile texture and whitening.

In Example 1, the transparent film layer was thin and the second film layer uniformly penetrated the textile fabric layer by hot-air processing. Thus, the textile texture and appearance were good, and durability performance such as wear resistance and stain resistance was improved by virtue of uniform adhesion. By applying the transparent film layer, it can be confirmed that initial stain resistance and removability for liquid and solid staining sources (denim staining source) were superior.

Test Example 2: Comparison of Physical Properties

The physical properties of Examples 2 and 3 and Comparative Examples 1-8 were compared. The results thereof are shown in Table 2 below.

TABLE 2

| | Classification | | Example 2 | Example 3 | Comp. Example 2 | Comp. Example 3 | Comp. Example 4 |
|---|---|---|---|---|---|---|---|
| Coating layer (extrusion basis) | Manufacturing method | | Simultaneous extrusion of first film layer and second film layer (thin-film double extrusion) | | | | |
| | Total thickness [mm] | | 0.08 | 0.15 | 0.40 | 0.15 | 0.06 |
| | First film layer [mm] | | 0.03 | 0.05 | 0.20 | 0.05 (Tm 190° C. ↑) | 0.03 |
| | Second film layer [mm] | | 0.05 | 0.10 | 0.20 | 0.10 (Tm 100° C. ↓) | 0.03 |
| Textile fabric | Total thickness [mm] | | 0.50 | 0.60 | 0.60 | 0.60 | 0.60 |
| | Lamination of layers (S400) | | Hot pressing | Hot pressing | Hot pressing | Hot pressing | Hot pressing |
| Physical properties | Wear resistance (grade) | For interiors (250 times, grade 3 basis) | Grade 4-5 | Grade 4-5 | Grade 4-5 | Grade 2-3 | Grade 2-3 |
| | Stain resistance (ΔE) | Denim staining (state 8/4 or less after removal) | 4.2/2.2 | 4.4/2.5 | 4.1/2.2 | 5.5/1.9 | 5.7/1.8 |
| Appearance | Transparency | | Good | Good | Poor | Good | Good |
| | Textile texture after lamination (height of weaving irregularities) | | Good (0.1-0.2) | Good (0.1-0.2) (less than 0.1) | Poor | Fair | Poor (low uniformity) |
| | Poor lamination/ whitening | | Good | Good | Good | Poor (whitening/peeling) | Poor (whitening/peeling) |

| | Classification | Comp. Example 5 | Com. Example 6 | Comp. Example 7 (transparent PVC) | Comp. Example 8 (PU) | Comp. Example 1 (general textile) |
|---|---|---|---|---|---|---|
| Coating layer (extrusion | Manufacturing method | Simultaneous extrusion of first film layer and second film layer (thin-film double extrusion) | | Calendaring | RP casting | — |

TABLE 2-continued

| basis) | Total thickness [mm] | | 0.15 | 0.15 | 0.40 | 0.15 | Unapplied |
| | First film layer [mm] | | 0.05 (Hardness 15D) | 0.05 | Top 0.20 | 0.07 | — |
| | Second film layer [mm] | | 0.10 (Hardness 15D) | 0.10 | Bottom 0.20 | 0.08 | — |
| Textile fabric | Total thickness [mm] | | 0.60 | 0.60 | 0.60 | 0.60 | 0.60 |
| | Lamination of layers (S400) | | Hot pressing | Cold pressing | Calendaring | Adhesion lamination | — |
| Physical properties | Wear resistance (grade) | For interiors (250 times, grade 3 basis) | Grade 2 | Grade 2-3 (torn) | Grade 4-5 | Grade 4-5 | Grade 4 |
| | Stain resistance (ΔE) | Denim staining (state 8/4 or less after removal) | 5.5/1.9 | 5.7/1.9 | 7.1/3.6 | 7.4/3.7 | 9.1/ impossible to remove |
| Appearance | Transparency | | Good | Good | Fair | Poor | — |
| | Textile texture after lamination (height of weaving irregularities) | | Fair | Fair (less than 0.1) | Poor | Fair | Good (0.2-0.3) |
| | Poor lamination/ whitening | | Poor (whitening/peeling) | Poor (whitening) | Poor (whitening) | Poor (whitening) | — |

With reference to Table 2, in Comparative Examples 2 and 4 compared to Examples 2 and 3, the total thickness of the transparent film layer fell out of the standard range. Thus, product quality such as transparency and height of weaving irregularities after lamination deteriorated.

In Comparative Example 3, as a difference in Tm between the first film layer and the second film layer increased, the transparent film layer was not uniformly adhered, resulting in poor wear resistance and lamination.

such as poor transparency and undesired height of weaving irregularities were confirmed.

Test Example 3: Comparison of Cross-Section and Surface

The cross-section and surface of Examples 2 and 3 and Comparative Examples 1, 6, and 7 were compared. The results thereof are shown in Table 3 below and FIGS. 6-10.

TABLE 3

| Classification | Example 2 | Example 3 | Comparative Example 1 | Comparative Example 6 | Comparative Example 7 |
|---|---|---|---|---|---|
| Thickness of transparent coating layer (mm) | 0.08 | 0.15 | Unapplied | 0.15 | 0.40 |
| Lamination process (in S400) | Hot pressing | Hot pressing | Unapplied | Cold pressing | Calendaring |
| Cross-section shape | Good | Good | Unapplied | Cross-section of whitening/foamed portion | Formed thickly (unevenness X) |
| Surface shape | Good | Good | Unapplied | Cloudy surface | Poor surface texture |

In Comparative Example 5, mechanical strength such as wear resistance or the like deteriorated when the first polyetherester-based copolymer having low hardness was selected.

In Comparative Example 6, a lamination process through cold pressing (omitting hot pressing) was performed. Thus, the transparent film layer was not uniformly adhered, resulting in poor wear resistance and lamination.

Figure 6:
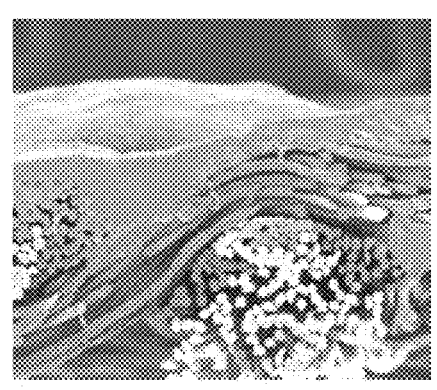
FIG. 6 shows the cross-section and surface images of Example 2.
Figure 6:
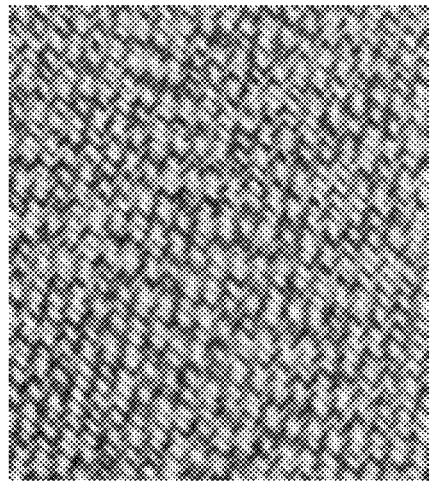
Figure 7:
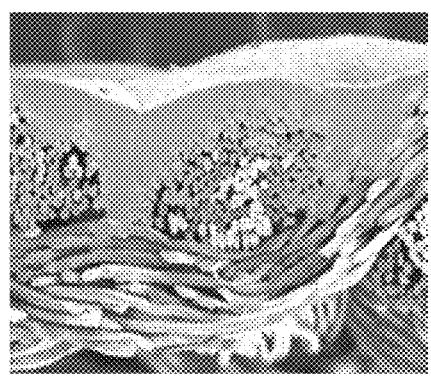
FIG. 7 shows the cross-section and surface images of Example 3.
Figure 7:
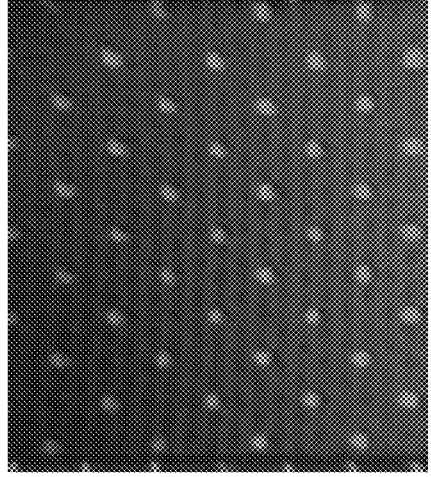
Figure 8:
FIG. 8 shows the cross-section and surface images of Comparative Example 1.
Figure 8:
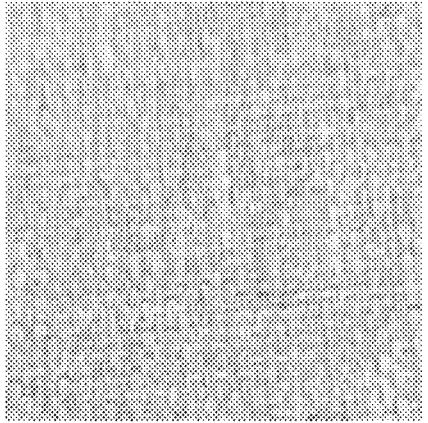
Figure 9:
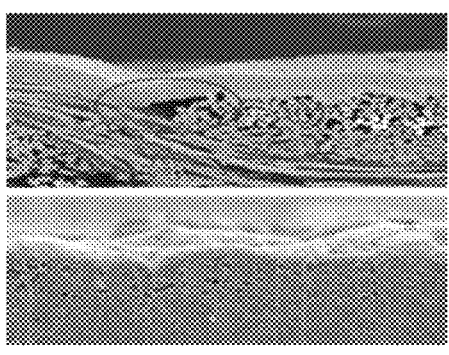
FIG. 9 shows the cross-section and surface images of Comparative Example 6.
Figure 9:
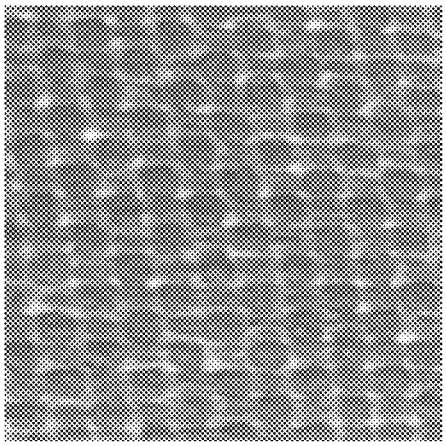
Figure 10:
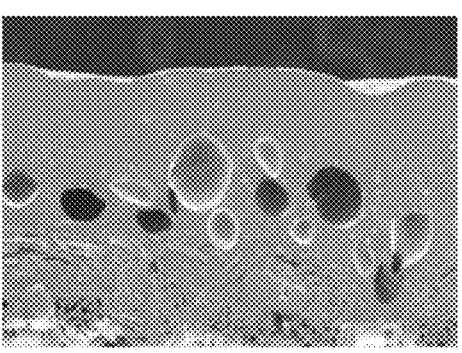
FIG. 10 shows the cross-section and surface images of Comparative Example 7.
Figure 10:
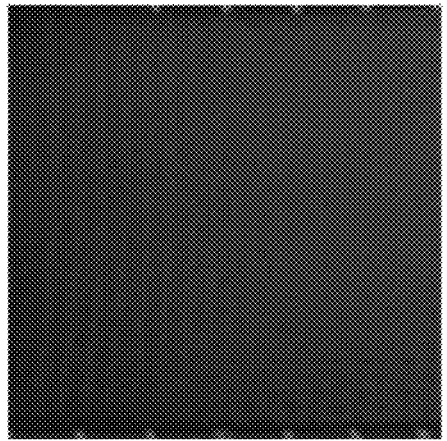

In Comparative Examples 7 and 8, when the conventional PU and PVC transparent layers were evaluated, problems FIG. 6 shows the cross-section and surface images of Example 2. FIG. 7 shows the cross-section and surface images of Example 3. FIG. 8 shows the cross-section and surface images of Comparative Example 1. FIG. 9 shows the cross-section and surface images of Comparative Example 6. FIG. 10 shows the cross-section and surface images of Comparative Example 7.

With reference to Table 3 and FIGS. 6-10, the cross-section and surface of Examples 2 and 3 were good compared to Comparative Example 1. Comparative Example 1 was a control in which the transparent coating layer and the lamination process were not applied.

However, in Comparative Example 6, in which the transparent film layer and the textile fabric layer were laminated using cold pressing, whitening and foaming occurred as can be seen from the cross-section image. Additionally, the surface was cloudy. Also, in Comparative Example 7, in which the transparent coating layer was thick and calendaring was performed, a thick cross-section without unevenness and a surface having poor surface texture can be confirmed.

As is apparent from the herein description, a textile fabric according to the present disclosure can satisfy durability and appearance for automobile interiors.

The textile fabric according to the present disclosure can satisfy desirable stain resistance and durability while realizing a textile appearance/texture as desired.

The effects of the present disclosure are not limited to the above-mentioned effects. It should be understood that the effects of the present disclosure include all effects that can be inferred from the description of the present disclosure.

Although specific embodiments of the present disclosure have been described, those having ordinary skill in the art should appreciate that the embodiments of the present disclosure may be embodied in other specific forms without changing the technical spirit or essential features thereof. Thus, the embodiments described above should be understood to be non-limiting and illustrative in every way.

What is claimed is:
1. A textile fabric comprising:
a textile fabric layer; and
a transparent film layer disposed on the textile fabric layer, wherein the transparent film layer comprises a first film layer having a first polyetherester-based copolymer and a second film layer having a second polyetherester-based copolymer, wherein the second film layer is disposed on the textile fabric layer, and wherein a melting point of the second film layer is lower than a melting point of the first film layer.

2. The textile fabric of claim 1, further comprising a surface layer disposed on the first film layer, the surface layer including a polymer resin.

3. The textile fabric of claim 2, wherein the polymer resin comprises polyurethane.

4. The textile fabric of claim 2, wherein the surface layer has a thickness in a range of 0.005 millimeters (mm) to 0.02 mm.

5. The textile fabric of claim 1, wherein the first film layer has a thickness in a range of 5 micrometers ($\mu$m) to 50 $\mu$m.

6. The textile fabric of claim 1, wherein the second film layer has a thickness in a range of 50 $\mu$m to 100 $\mu$m.

7. The textile fabric of claim 1, wherein the transparent film layer has a thickness in a range of 55 $\mu$m to 150 $\mu$m.

8. The textile fabric of claim 1, wherein the first polyetherester-based copolymer has a melting point (Tm) in a range of 150° C. to 190° C., a hardness in a range of 20D to 30D (SHORE D hardness tester), and a melt index (MI) in a range of 10 to 50 grams per 10 minutes (g/10 min) (220° C./2.16 kilograms (kg)).

9. The textile fabric of claim 1, wherein the second polyetherester-based copolymer has a melting point (Tm) in a range of 100° C. to 160° C., a hardness in a range of 15D to 25D (SHORE D hardness tester), and a melt index (MI) in a range of 10 to 40 g/10 min (230° C./2.16 kg).

\* \* \* \* \*